E. SCHNEIDER.
APPARATUS FOR LAUNCHING TORPEDOES FROM UNDER WATER TUBES.
APPLICATION FILED JUNE 16, 1919.

1,318,014.

Patented Oct. 7, 1919.
6 SHEETS—SHEET 3.

E. SCHNEIDER.
APPARATUS FOR LAUNCHING TORPEDOES FROM UNDER WATER TUBES.
APPLICATION FILED JUNE 16, 1919.

1,318,014. Patented Oct. 7, 1919.
6 SHEETS—SHEET 4.

E. SCHNEIDER.
APPARATUS FOR LAUNCHING TORPEDOES FROM UNDER WATER TUBES.
APPLICATION FILED JUNE 16, 1919.

1,318,014.

Patented Oct. 7, 1919.
6 SHEETS—SHEET 5.

E. SCHNEIDER.
APPARATUS FOR LAUNCHING TORPEDOES FROM UNDER WATER TUBES.
APPLICATION FILED JUNE 16, 1919.

1,318,014.

Patented Oct. 7, 1919.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

APPARATUS FOR LAUNCHING TORPEDOES FROM UNDER-WATER TUBES.

1,318,014. Specification of Letters Patent. Patented Oct. 7, 1919.

Application filed June 16, 1919. Serial No. 304,652.

*To all whom it may concern:*

Be it known that I, EUGÈNE SCHNEIDER, a resident of Paris, in the Republic of France, have invented new and useful Improvements in Apparatus for Launching Torpedoes from Under-Water Tubes, which invention is fully set forth in the following specification.

In my earlier application filed 10th September, 1918, Ser. No. 253455, I have described an apparatus adapted to underwater tubes for launching torpedoes for use in submarines and other vessels, which allows the person charged with the operations to effect by a single movement the three following successive operations, namely:

1.—The opening of the door that closes the front end of the tube.

2.—The liberation of the torpedo that is held back in the tube by devices such as brakes, bolts or the like.

3.—The release of the ejecting device proper which comprises according to the circumstances of the case, either the ignition of a powder charge, or the setting into operation of a blast of compressed air, or the actuation of an ejecting piston, etc.

The present invention has for its object to provide an improved apparatus of this kind.

The present improvement consists in combining the counter-rod of the operating piston with a mechanism for producing automatically the opening of the air conservation valve of the torpedo.

Hitherto it has been necessary to open this valve by hand by means of a key. As is well known, this valve is arranged on the piping that establishes communication between the air reservoir and the valve for admitting air to the engine. This valve is in general operated automatically by a lever projecting from the torpedo, said lever on meeting a tappet which projects into the interior of the torpedo-launching tube, being turned back as the torpedo is driven out of the tube.

It has not always been possible to keep this valve airtight, so that the compressed air in the launching reservoir has sometimes escaped little by little through this valve, and the reservoir has been emptied. The interposition of the conservation valve has no other object than to assure with certainty the conservation of the air in the reservoir.

The forgetting to open this valve would have the serious drawback of rendering the launching inoperative since the torpedo would stop immediately after leaving the tube. As the communication between the launching reservoir and the engine would be shut off, the compressed air could not reach the engine, and the latter would not work.

The present invention is designed to prevent this contingency and to obviate certain possible drawbacks by causing the conservation valve to open automatically at the moment when the three operations above referred to are being effected, this being done by the same movement of the man charged with the launching.

The present invention consists essentially in an apparatus provided on the counter-rod of the operating piston, which apparatus is combined with a key for actuating the conservation valve in such a manner as to impart to the latter a rotational motion which will cause it to be opened by means of the said key, and to insure that the said key will then move out of the way to allow of an unhindered exit of the torpedo.

A constructional form of this improved apparatus is illustrated by way of example in the accompanying drawings in which.

The counter-rod F of the operating piston is adapted to slide in a sleeve A, and it carries projecting from it at diametrally opposite points, two rollers $a^1$ and $a^2$ mounted for instance on a pin $a^3$ and fixed by means of a washer $a^4$ and a screw $a^5$. Each of these rollers works in a helical groove $a^6$ formed in the sleeve A. The sleeve A is held in place by bearings $D^1$ and $D^2$ formed on the torpedo-launching tube T in such a manner that the said sleeve cannot move longitudinally. The number of rollers and corresponding grooves may of course be carried as desired.

A second sleeve B mounted on the sleeve A carries a cam $b^1$ which is designed as hereinafter described to cause the actuating key G of the conservation valve to move out of the way.

Figure 1:
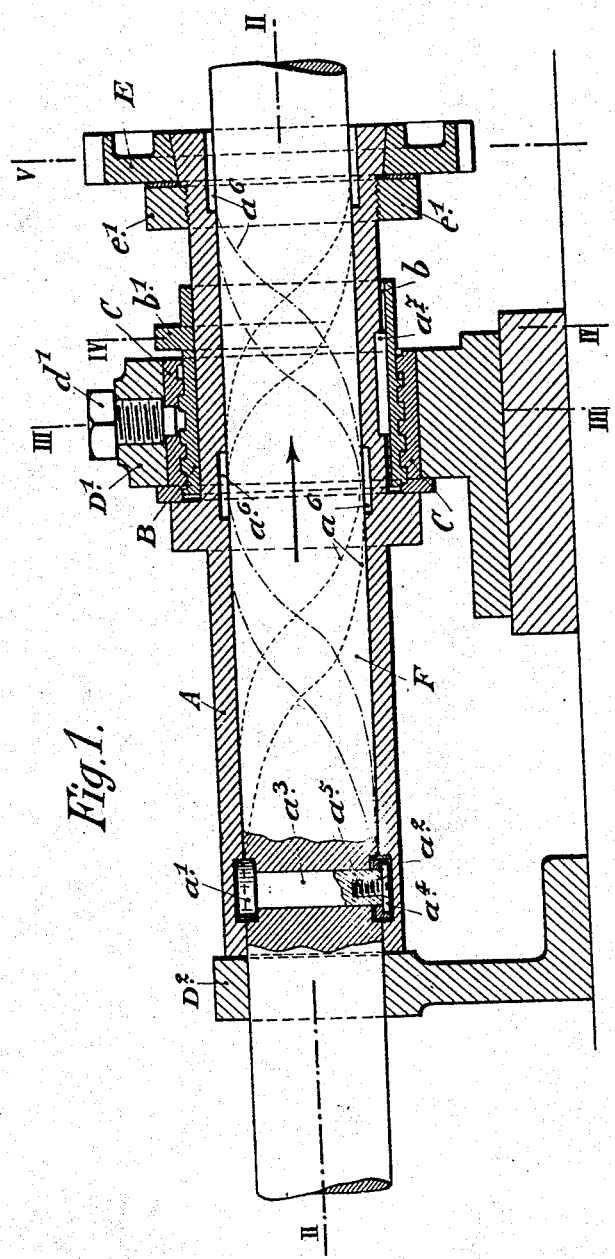
Figure 1 is a longitudinal section on the line I—I of Fig. 2 showing the parts mounted on the counter-rod of the piston.
Figure 2:
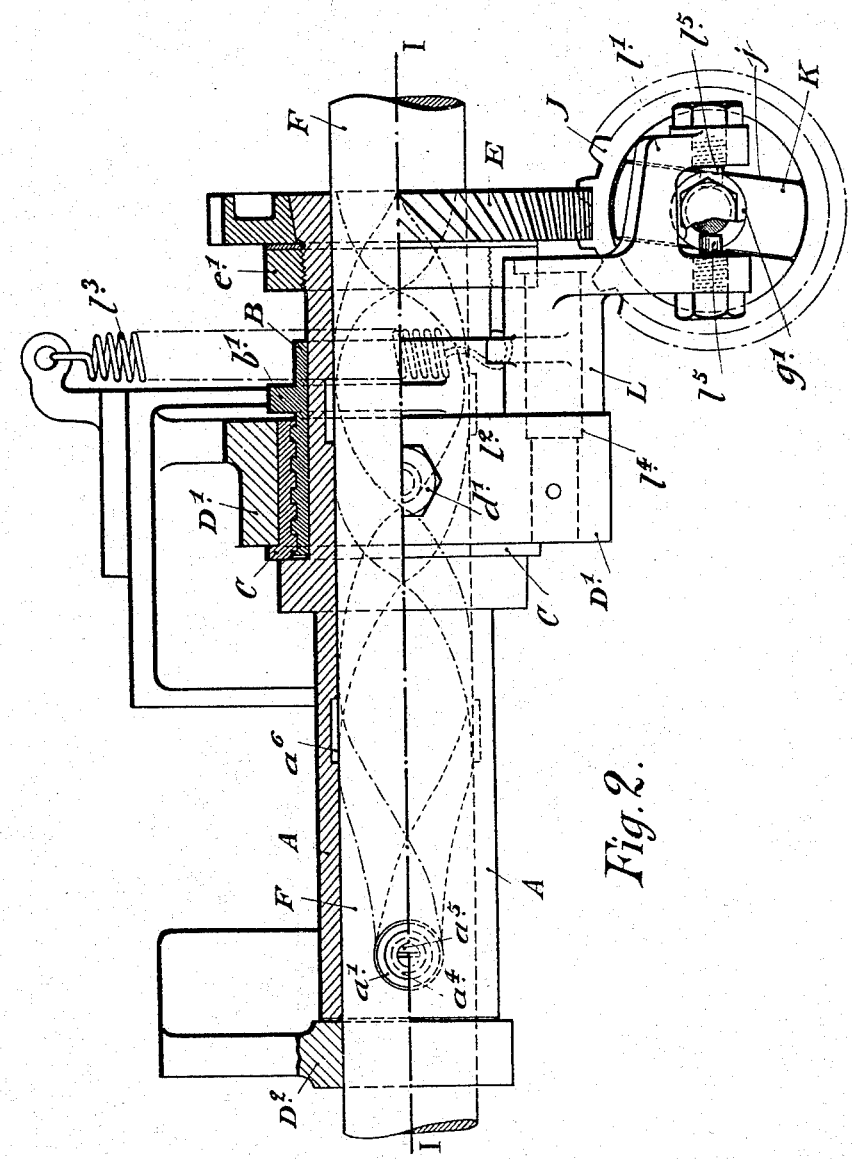
Fig. 2 is in one half a half plan of the general arrangement of the improved apparatus, and in its other half a half section on the line II—II of Fig. 1.
Figure 3:
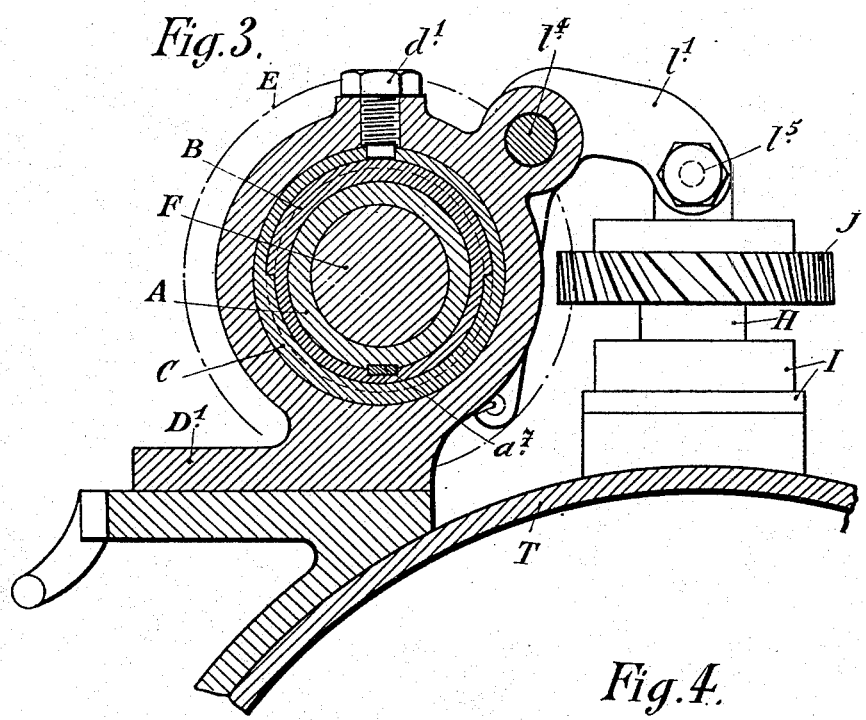
Fig. 3 is a cross section on the line III—III of Fig. 1.
Figure 4:
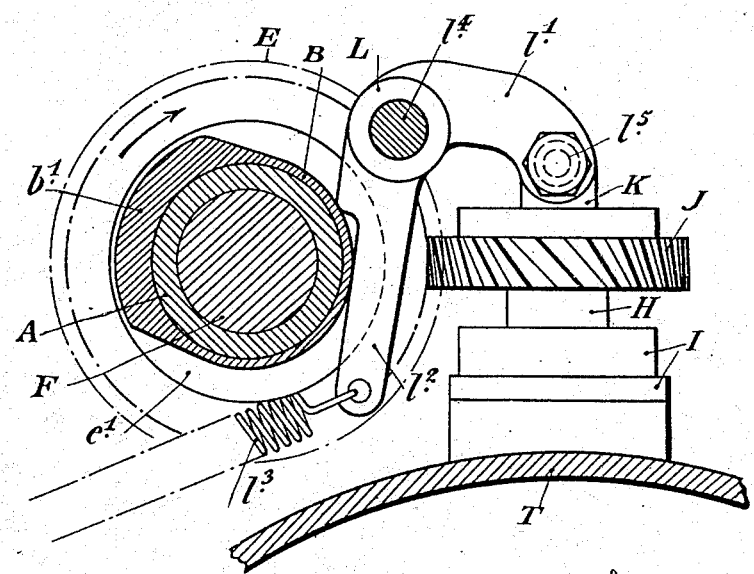
Fig. 4 is a cross section on the line IV—IV of Fig. 1.
Figure 5:
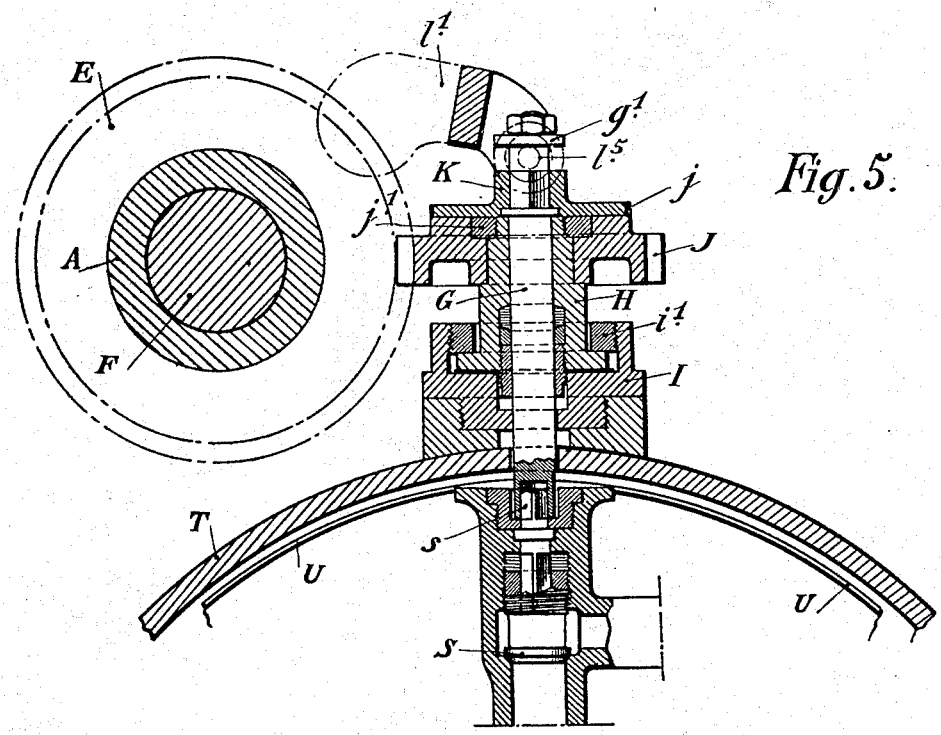
Fig. 5 is a cross section on the line V—V of Fig. 1, showing the operating key engaged on the conservation valve ready for opening the latter.

An ordinary construction of this valve is shown in Fig. 5. S is the valve proper. To raise this valve it is necessary to engage a key on the square end $s$ of the valve spindle and to rotate this spindle on its own axis.

The sleeve B is adapted to slide along the sleeve A by means of a groove $b$ guided on a feather $a^7$ that compels the sleeve B to rotate with the sleeve A.

This sleeve B has an external screw-thread working in the internal screw-thread of a nut C mounted in the bearing $D^1$ to which the nut is fixed by means of a set screw $d^1$. Beyond the cam $b^1$, the sleeve B terminates in a cylindrical portion.

The free end of the sleeve A carries a wheel E with helical teeth. This wheel is locked against a conical bearing surface of the sleeve A by means of a nut $e^1$; it can however be made loose by slacking the nut $e^1$.

The bearing $D^1$ has a lug in which is fixed an axle pin $l^4$ forming the pivot for the hub L of a bent lever $l^1$—$l^2$, the arm $l^2$ of which is drawn by a spring $l^3$ so that it has a constant tendency to bear against the cylindrical portion of the sleeve B. The other arm $l^1$ ends in a fork the limbs of which carry pins $l^5$ engaging in a groove formed in the upper end of the key G for operating the air conservation valve of the torpedo.

The lower portion of the key G is engaged on the square end of the head $s$ of the valve spindle so as to move the latter with it in its rotational motion and so as to be able to slide along it in its rising and falling movements. The key is guided in a support H carried by a box I fixed on the torpedo-launching tube T. A nut $i^1$ serves to hold the support H in the box I.

The apparatus constituted by the support H, the box I and the nut $i^1$ is provided for facilitating at the moment of placing the torpedo into the tube, the engagement of the key on the valve spindle since the latter cannot be strictly in line with the said key.

A helical wheel J meshing with the wheel E is mounted loose on the support H whereon it is held by a nut $j^1$.

Figure 6:
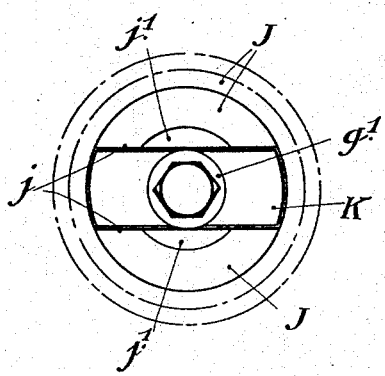
Fig. 6 is a partial plan of the same.
Figure 7:
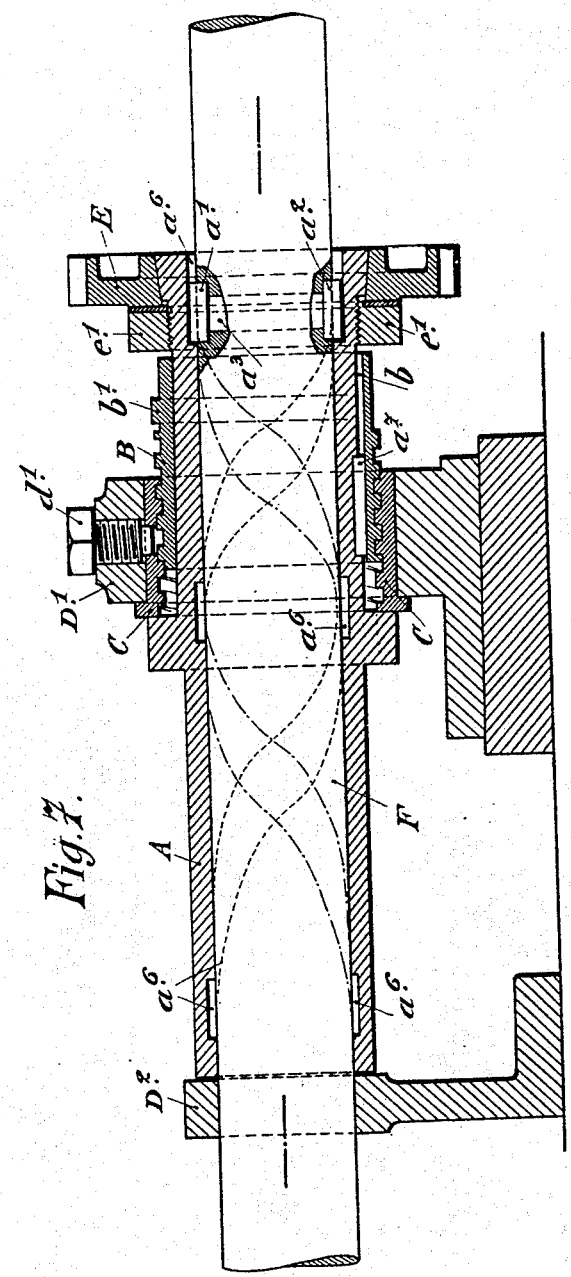
Figs. 7 and 8 are views similar to Figs. 1 and 4; they show the position occupied by the parts when the conservation valve is open, and the actuating key has been moved out of the way.
Figure 8:
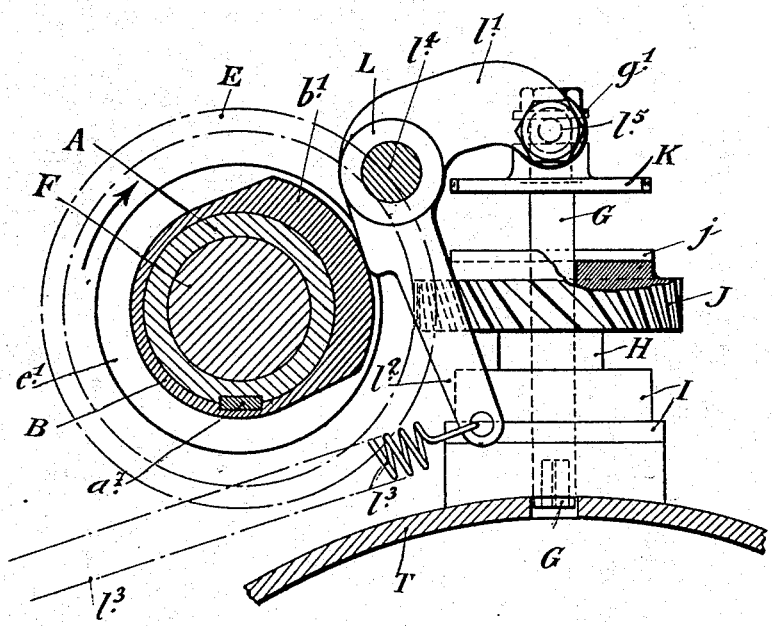

A tappet K fixed on the key by means of a square part, engages in a groove $j$ (Figs. 6 and 8) formed on the wheel J in such a manner as to connect the latter to the key which it carries with it in its rotational movements.

The key terminates at its upper end in a shouldered nut $g^1$ against the underside of which bear the two fingers $l^5$ carried by the fork of the lever arm $l^1$, for the purpose of carrying the key along with it in the rising movement of the lever. These fingers also carry the key along with them in the descending movements of the lever arm $l^1$ bearing then upon the tappet K.

The operation is as follows:

When the torpedo U is in place in the tube T, the operating key G is fitted upon the square head $s$ of the spindle.

Since the axes of these parts may possibly not coincide strictly with one another, the nut $i^1$ is unscrewed from the box I, thus freeing the support H which can then be shifted slightly parallel to the axis of the tube T until the coincidence between the axes is assured, and then the engagement can be effected. For this purpose, by unscrewing the nut $e^1$, the wheel E is made loose, and the tappet K is rotated by hand in such a manner as to engage the key G upon the square parts of the valve, and it is pushed right home by causing the tappet K to enter the groove $j^1$ of the wheel J which has been suitably turned for this purpose.

When the key is in place, the nuts $i^1$ are $e^1$ are screwed up tight. The improved apparatus is then ready to operate.

The maneuver of launching the torpedo described in my aforesaid earlier application, causes the counter-rod F to move in the direction of the arrow. The rollers $a^1$ and $a^2$ engaged in the grooves of the sleeve A, impart a rotational movement to the latter. (The pitch which is identical for both grooves may be made of gradually diminishing steepness in order to slacken the rotational motion of the sleeve at the moment of releasing the mechanism, and to facilitate the unsticking of the valve). The toothed wheel E carried around by the sleeve A, produces a rotational motion of the wheel J, and consequently of the tappet K, key G and the spindle $s$ of the air conservation valve of the torpedo. This motion causes the valve to open.

The rotation of the sleeve A produces also a rotation of the sleeve B which, being engaged by means of its screw-thread in the nut C, receives at the same time a movement of translation, whereby at a given instant which is predetermined and corresponds to the instant when the conservation valve is almost wholly open, the cam $b^1$ which is made in one piece with the sleeve B, bears against the arm $l^2$ of the lever L and causes it to pivot, and thus causes also a rise of the arm $l^1$ and consequently a rise of the key G, which then becomes disengaged from the spindle S of the valve, and consequently ceases to constitute an obstacle to the forward movement of the torpedo. The end of this movement corresponds to the instant when, the torpedo being released, the counter-rod F is about to actuate the launching valve in the manner described in my aforesaid earlier application. A concentric portion of the cam allows the extent of the rise of the key to be limited during this short interval of time.

After firing, during the maneuver of closing the tube cap, the various parts of the mechanism return by reverse movements into their initial position.

What I claim is:

1. An improvement in torpedo launching apparatus characterized by the feature that the prolongation of the counter-rod of the operating piston comprises a mechanism combined with a key for operating the air conservation valve of the torpedo installed on the torpedo-launching tube, the connection between the said mechanism and the said key being such that when the key has been engaged upon the spindle of the valve, after introduction of the torpedo into the tube, the longitudinal displacement of the counter-rod will produce successively the rotation of the valve around the axis of its spindle for its opening, through the medium of a rotation of the key, and then a rising or moving of the key out of the way.

2. An apparatus as claimed in claim 1, wherein the rotational motion of the key is produced by the rotation of a sleeve having helical grooves held longitudinally between the guides of the counter-rod, in which grooves are engaged rollers carried by the said counter-rod; the said sleeve carrying a helical toothed wheel gearing with a pinion adapted to be moved by a tappet fixed to the said key; the rotational motion of the sleeve being converted into a longitudinal displacement of a second sleeve which surrounds it and is provided with a cam adapted to engage at the desired moment with one of the arms of a bell crank lever fulcrumed on a fixed part, the other arm of said lever being engaged by a fork in a groove in the operating key.

3. In torpedo launching apparatus, a torpedo launching operating rod, a valve adapted to control fluid pressure in the torpedo, a key adapted to operate said valve and connections between said key and said rod for automatically giving rotational movement to said key for opening said valve and longitudinal movement thereto for releasing the key from said valve before launching.

4. In torpedo launching apparatus, a torpedo launching operating rod provided with a sleeve rotated by the longitudinal movement of said rod, a valve adapted to control fluid pressure in the torpedo, a key adapted to operate said valve and connections between said key and said sleeve for automatically giving rotational movement to said key for opening said valve and longitudinal movement thereto for releasing said key from said valve before launching.

5. In torpedo launching apparatus, a torpedo launching operating rod provided with a sleeve rotated by the longitudinal movement of said rod, a second sleeve mounted on the first named sleeve and adapted to advance over the first sleeve, a valve for controlling fluid pressure in the torpedo, a key adapted to operate said valve and connections between said key and each of said sleeves for rotating the key to open the valve and to withdraw the key from said valve.

In testimony whereof, I have signed this specification.

EUGÈNE SCHNEIDER.

Witnesses:
 ANDRÉ MOSTICKER,
 CHAS. P. PRESSLY.

Copies of this patent may be obtained for five cents each, by addressing the "Commissioner of Patents, Washington, D. C."